United States Patent
Yuan

(10) Patent No.: US 11,196,935 B2
(45) Date of Patent: Dec. 7, 2021

(54) METHOD AND APPARATUS FOR ACCELERATING AEC CONVERGENCE, AND TERMINAL DEVICE

(71) Applicant: GUANGDONG OPPO MOBILE TELECOMMUNICATIONS CORP., LTD., Guangdong (CN)

(72) Inventor: Quan Yuan, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 113 days.

(21) Appl. No.: 16/743,544

(22) Filed: Jan. 15, 2020

(65) Prior Publication Data

US 2020/0154022 A1 May 14, 2020

Related U.S. Application Data

(63) Continuation of application No. PCT/CN2018/090586, filed on Jun. 11, 2018.

(30) Foreign Application Priority Data

Jul. 25, 2017 (CN) .......................... 201710612898.1

(51) Int. Cl.
*H04N 5/235* (2006.01)
*H04N 5/225* (2006.01)
*H04N 5/232* (2006.01)

(52) U.S. Cl.
CPC ........... *H04N 5/235* (2013.01); *H04N 5/2258* (2013.01); *H04N 5/23212* (2013.01); *H04N 5/23218* (2018.08)

(58) Field of Classification Search
CPC ............. H04N 5/2258; H04N 5/23212; H04N 5/23218; H04N 5/235
See application file for complete search history.

(56) References Cited

U.S. PATENT DOCUMENTS 8,675,091 B2 * 3/2014 Silverstein ........... H04N 5/2258
348/223.1
8,964,062 B1 * 2/2015 Neglur ................. H04N 5/2353
348/230.1
(Continued)

FOREIGN PATENT DOCUMENTS

CN 104954699 A 9/2015
CN 105208360 A 12/2015
(Continued)

OTHER PUBLICATIONS

European search report, EP18839491, dated May 29, 2020 (8 pages).
(Continued)

*Primary Examiner* — John Villecco
(74) *Attorney, Agent, or Firm* — Young Basile Hanlon & MacFarlane, P.C.

(57) ABSTRACT

A method and apparatus for accelerating automatic exposure control (AEC) convergence, and a terminal device are disclosed. The method includes: acquiring a first AEC value of a first camera module in an automatic-exposure convergent state under a current scene; sharing the first AEC value under the current scene with a second camera module; operating the second camera module to start converging from the first AEC value in response to turning on the second camera module under the current scene, and acquiring a second AEC value of the second camera module in the automatic-exposure convergent state.

16 Claims, 6 Drawing Sheets

(56) References Cited

U.S. PATENT DOCUMENTS

| | | | |
|---|---|---|---|
| 9,615,012 B2* | 4/2017 | Geiss | H04N 13/239 |
| 10,057,499 B1* | 8/2018 | Chen | H04N 5/2353 |
| 10,171,731 B2* | 1/2019 | Jung | G06K 9/00671 |
| 10,187,585 B2* | 1/2019 | Guo | H04N 5/243 |
| 10,200,599 B1* | 2/2019 | Baldwin | H04N 5/23216 |
| 10,334,149 B2* | 6/2019 | Baldwin | H04N 5/2259 |
| 10,484,600 B2* | 11/2019 | Baek | H04N 13/239 |
| 10,694,126 B2* | 6/2020 | Lee | H04N 5/23212 |
| 10,819,913 B2* | 10/2020 | Yuan | H04N 5/2352 |
| 2011/0149045 A1* | 6/2011 | Wuerz-Wessel | G03B 7/09979 348/49 |
| 2012/0002958 A1 | 1/2012 | Muukki | |
| 2012/0229588 A1 | 9/2012 | Greenfield | |
| 2014/0071330 A1 | 3/2014 | Zhang et al. | |
| 2015/0156388 A1 | 6/2015 | Neglur | |
| 2015/0181120 A1 | 6/2015 | Tsuchida et al. | |
| 2015/0229889 A1 | 8/2015 | Boettiger | |
| 2016/0142629 A1* | 5/2016 | Jung | H04N 5/23216 348/218.1 |
| 2016/0227100 A1 | 8/2016 | Liu et al. | |
| 2016/0337598 A1 | 11/2016 | Zaitsev et al. | |
| 2017/0006208 A1* | 1/2017 | Du | G03B 17/00 |
| 2017/0150061 A1 | 5/2017 | Shabtay et al. | |
| 2017/0155830 A1* | 6/2017 | Chien | H04N 5/23218 |
| 2017/0272644 A1 | 9/2017 | Chou et al. | |
| 2017/0351932 A1* | 12/2017 | Uliyar | H04N 5/2258 |
| 2018/0013955 A1* | 1/2018 | Kim | G06F 1/1686 |
| 2018/0070009 A1* | 3/2018 | Baek | H04N 5/23216 |
| 2019/0007589 A1* | 1/2019 | Kadambala | H04N 5/23241 |
| 2020/0162675 A1* | 5/2020 | Yuan | H04N 5/2351 |

FOREIGN PATENT DOCUMENTS

| | | |
|---|---|---|
| CN | 106713718 A | 5/2017 |
| CN | 106814518 A | 6/2017 |
| CN | 106851063 A | 6/2017 |
| JP | 2000299814 A * | 10/2000 |
| TW | I573459 B | 3/2017 |

OTHER PUBLICATIONS

English translation of the Office Action from China patent office in a counterpart Chinese patent Application 201710612898.1, dated Jun. 5, 2019 (10 pages).

International search report, PCT/CN2018/090586, dated Aug. 29, 2018 (2 pages).

First Office Action from China patent office in a counterpart Chinese patent Application 201710612898.1, dated Mar. 14, 2019 (6 pages).

Indian Examination Report for IN Application 202017007959 dated Apr. 29, 2021. (6 pages).

* cited by examiner

METHOD AND APPARATUS FOR ACCELERATING AEC CONVERGENCE, AND TERMINAL DEVICE

CROSS-REFERENCE TO RELATED APPLICATION(S)

This application is a continuation application of International (PCT) Patent Application No. PCT/CN2018/090586, filed on Jun. 11, 2018, which claims priority to Chinese Patent Application No. 201710612898.1, filed on Jul. 25, 2017, the contents of both of which are herein incorporated by reference in their entireties.

TECHNICAL FIELD

The present disclosure relates to the field of electronic devices, and in particular, to a method and an apparatus for accelerating AEC convergence, and a terminal device.

BACKGROUND

For a photographing device having two cameras, after switching a zoom factor, during an Automatic Exposure Control (AEC) process (that is, the process during which the automatic exposure value of a camera which is in use after the switching starts converging from an initial state, and gradually converges to a steady state) of the camera, a flash may occur, and the flash may be then gradually darken.

SUMMARY

In some embodiments according to some aspects of the present disclosure, a method for accelerating AEC convergence may be provided. The method may include: acquiring a first AEC value of a first camera module in an automatic-exposure convergent state under a current scene; sharing the first AEC value under the current scene with a second camera module; and operating the second camera module to start converging from the first AEC value in response to turning on the second camera module under the current scene, and acquiring a second AEC value of the second camera module in the automatic-exposure convergent state.

In some embodiments according to some aspects of the present disclosure, a terminal device may be provided. The terminal device may include a housing, a processor, a memory, a first camera module, and a second camera module. The processor, the memory, the first camera module, and the second camera module may be disposed in the housing. The memory may be configured to store an executable program code, and the processor may be configured to read and execute the executable program code to perform a method for accelerating AEC convergence. The method may include: acquiring a first AEC value of a first camera module in an automatic-exposure convergent state under a current scene; sharing the first AEC value under the current scene with a second camera module; and operating the second camera module to start converging from the first AEC value in response to turning on the second camera module under the current scene, and acquiring a second AEC value of the second camera module in the automatic-exposure convergent state.

In some embodiments according to some aspects of the present disclosure, a non-transitory computer-readable storage medium may be provided. The non-transitory computer-readable storage medium may store a computer program which, when executed by a processor, causes the processor to perform a method for accelerating AEC convergence. The method may include: acquiring a first AEC value of a first camera module in an automatic-exposure convergent state under a current scene; sharing the first AEC value under the current scene with a second camera module; and operating the second camera module to start converging from the first AEC value in response to turning on the second camera module under the current scene, and acquiring a second AEC value of the second camera module in the automatic-exposure convergent state.

Parts of additional aspects and advantages of the present disclosure will be set forth in the following description. The parts will become apparent from the following description or get to know from the practice of the present disclosure.

BRIEF DESCRIPTION OF DRAWINGS

In order to more clearly illustrate technical solutions in embodiments of the present disclosure, the drawings used in the embodiments will be briefly described below. Apparently, the drawings in the following description are some embodiments of the present disclosure. Those skilled in the art may also obtain other drawings based on these drawings without paying any creative work.

DETAILED DESCRIPTION

Figure 1:
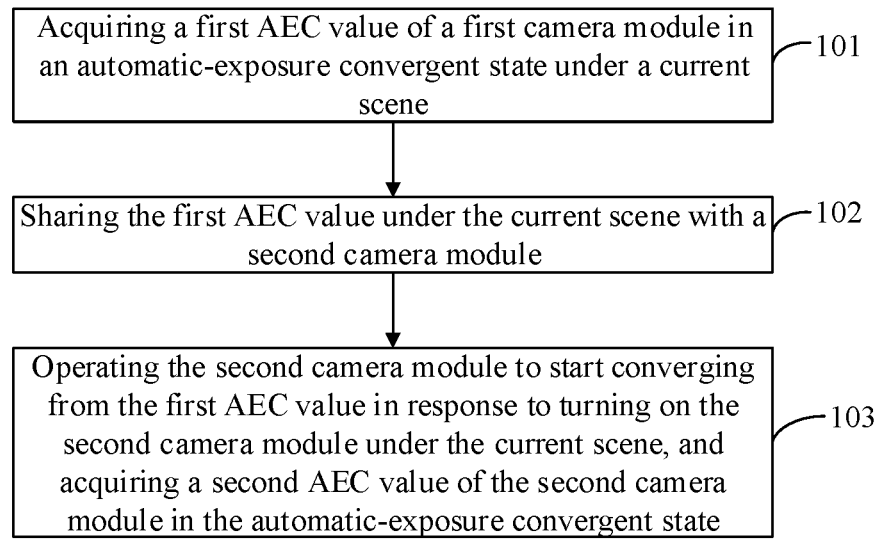
FIG. 1 is a flowchart of a method for accelerating AEC convergence according to some embodiments of the present disclosure.

The embodiments of the present disclosure will be described in detail below. Examples of the embodiments may be illustrated in the drawings. Same or similar reference numerals may be used to indicate same or similar elements or elements having same or similar functions. The embodiments described below with reference to the drawings are illustrative, and are not intended to be construed as limiting.

A method and an apparatus for accelerating AEC convergence, and a terminal device according to some embodiments of the present disclosure may be described below with reference to the accompanying drawings.

In some embodiments according to some aspects of the present disclosure, a method for accelerating AEC convergence may be provided. The method may include: acquiring a first AEC value of a first camera module in an automatic-exposure convergent state under a current scene; sharing the first AEC value under the current scene with a second camera module; and operating the second camera module to start converging from the first AEC value in response to turning on the second camera module under the current scene, and acquiring a second AEC value of the second camera module in the automatic-exposure convergent state.

In some embodiments, the sharing the first AEC value under the current scene with a second camera module, may include: monitoring a turn-on instruction for turning on the second camera module; and updating a current AEC value of the second camera module by utilizing the first AEC value.

In some embodiments, the turn-on instruction is generated in response to at least one selected from a group consisting of: a triggering operation for switching a zoom factor; and a state of the first camera module being in the automatic-exposure convergent state.

In some embodiments, the method may further include: monitoring a camera module in an active state; and recording and storing a third AEC value of the camera module in the active state into a designated buffer, in response to receiving a turn-off instruction for turning off the camera module in the active state by monitoring.

In some embodiments, the recording and storing a third AEC value of the camera module in the active state into a designated buffer, in response to receiving a turn-off instruction for turning off the camera module in the active state by monitoring, may include: recording the third AEC value of the first camera module and storing the third AEC value into the buffer in response to the camera module in the active state being the first camera module; or recording the third AEC value of the second camera module and storing the third AEC value into the buffer in response to the camera module in the active state being the second camera module.

In some embodiments, before acquiring a first AEC value of a first camera module in an automatic-exposure convergent state under a current scene, the method may further include: activating the first camera module; reading the third AEC value from the buffer; and operating the first camera module to start converging from the third AEC value.

In some embodiments, the turn-off instruction is generated in response to at least one selected from a group consisting of: switching from a photographing interface to another interface; and clicking a return button on the photographing interface.

In some embodiments, the method may further include: analyzing a first preview image of the first camera module and a second preview image of the second camera module; and determining that the second camera module is at a same scene with the first camera module in response to the first preview image being similar to the second preview image.

In some embodiments, the analyzing a first preview image of the first camera module and a second preview image of the second camera module, may include: determining whether the first preview image is similar to the second preview image according to objects or colors comprised in the first preview image and the second preview image.

In some embodiments, the determining whether the first preview image is similar to the second preview image according to objects or colors comprised in the first preview image and the second preview image, may include: acquiring a similarity between the first preview image and the second preview image, and determining that the first preview image is similar to the second preview image in response to the similarity being greater than or equal to a first threshold; or acquiring a color difference between the first preview image and the second preview image, and determining that the first preview image is similar to the second preview image in response to the color difference being less than a second threshold.

In some embodiments, the method may further include: acquiring a first turn-on time point of the first camera module and a second turn-on time point of the second camera module; and determining that the second camera module is at the same scene with the first camera module in response to a time interval between the second turn-on time point and the first turn-on time point being within a preset time interval.

In some embodiments according to some aspects of the present disclosure, a terminal device may be provided. The terminal device may include a housing, a processor, a memory, a first camera module, and a second camera module. The processor, the memory, the first camera module, and the second camera module may be disposed in the housing. The memory may be configured to store an executable program code, and the processor may be configured to read and execute the executable program code to perform the method for accelerating AEC convergence as previously described.

In some embodiments according to some aspects of the present disclosure, a non-transitory computer-readable storage medium may be provided. The non-transitory computer-readable storage medium may store a computer program which, when executed by a processor, causes the processor to perform the method for accelerating AEC convergence as previously described.

At present, two camera modules in a photographing device usually work independently from each other, and data will not be shared between the two camera modules. Therefore, after one of the camera modules is switched to the other of the camera modules for operation, the AEC of the other camera module after switching still start converging from a default AEC value. Thus, the convergence speed is slow.

For this, in some embodiments of the present disclosure, a method for accelerating AEC convergence may be provided. In some embodiments, an AEC value at which AEC convergence of a first camera module is finished may be shared with a second camera module turned on at a same scene with the first camera module. In this way, the second camera module is enabled to start converging from the received AEC value. Thus, a convergence time of the AEC of the second camera module may be shortened, and the AEC convergence may be accelerated.

FIG. 1 is a flowchart of a method for accelerating AEC convergence according to some embodiments of the present disclosure.

As shown in FIG. 1, the method for accelerating the AEC convergence may include operations executed by the following blocks.

At block 101, a first AEC value of a first camera module in an automatic-exposure convergent state under a current scene may be acquired. That is to say, the first AEC value may be acquired when the first camera module is in the automatic-exposure convergent state under the current scene, which means the first camera module has finished the AEC convergence. The term "automatic-exposure convergent state" used in the present disclosure may refer to a state in which the automatic-exposure value (also called as "AEC value") of the camera module (the first camera or the second camera mentioned later) is convergent to a steady state, and the camera module (the first camera or the second camera) has finished the AEC convergence.

For example, a user may turn on a photographing device of a terminal device such as a mobile phone or a tablet computer, and use the photographing device to capture an image of a distant scene. In some embodiments, the photographing device may include the first camera module and a second camera module. When the user turns on the photographing device, the first camera module may be turned on by default.

After the first camera module is turned on, an AEC value may be acquired from a buffer, and the first camera module may be controlled or operated to start converging from the acquired AEC value. In some embodiments, a camera module in a photographing state (that is, in an active state) before the photographing device is turned off may have a third AEC value. In order to increase the convergence speed of the AEC, the third AEC value may be stored into a designated buffer.

More specifically, during the previous/last photographing process, a turn-off instruction may be needed to turn off the photographing device. In some examples, the turn-off instruction may be triggered, in response to the user clicking a return button on a photographing interface, or in response to the user switching the photographing interface, such as switching from the photographing interface to another interface. The photographing device may be turned off after receiving the turn-off instruction.

In some embodiments, a monitor may be arranged. The monitor may be configured to monitor the turn-off instruction. The third AEC value utilized by the camera module in the photographing state may be recorded and stored in the buffer, in response to receiving the turn-off instruction for turning off the photographing device by monitoring. For example, in case that the camera module in the photographing state is the first camera module, then the third AEC value utilized by the first camera module may be recorded and stored in the buffer. In case that the camera module in the photographing state is the second camera module, the third AEC value utilized by the second camera module may be recorded and stored in the buffer. Of course, in some embodiments, the photographing device may include three or more camera modules. In case that the camera module in the photographing/active state is an additional camera module except for the first camera module and the second camera module, then the third AEC value utilized by the additional camera module in the photographing/active state may be recorded and stored in the buffer.

In response to turning on the photographing device again, the third AEC value utilized by the camera module which was in the photographing state during the previous photographing process may be read from the buffer. After that, the first camera module may be controlled or operated to start converging from the third AEC value, and the first AEC value of the first camera module in the automatic-exposure convergent state under a current scene may be acquired.

In some embodiments, the AEC value utilized by the camera module which was in the photographing state during the previous photographing process may be determined as an initial AEC value of the first camera module during the current photographing process. In this way, the first camera module may start converging from the initial AEC value, and the convergence speed of the first camera module at this time may be faster than the convergence speed of the first camera module starting converging from the default AEC value.

In some implementations, the AEC value stored in the buffer may be the default AEC value, and the first camera module may start converging from the default AEC value. It should be noted that although the first camera module starts converging from the default AEC value, which makes the convergence time is long, however, based on the solutions provided in some embodiments of the present disclosure, the AEC value of the first camera module may be shared with the second camera module in response to turning on the second camera module in the subsequence process. In this way, the convergence time of the second camera module may be reduced.

At block 102, the first AEC value under the current scene may be shared with the second camera module.

In order to increase the convergence speed of the AEC value of the second camera module, the first AEC value of the first camera module in the automatic-exposure convergent state under the current scene may be determined as the initial AEC value of the second camera module. In some embodiments, a turn-on instruction may be triggered in response to the user changing a zoom factor, and the second camera module may be turned on according to the turn-on instruction. After the photographing device has been turned on, the turn-on instruction for turning on the second camera module may be monitored. In response to receiving the turn-on instruction by monitoring, the first AEC value may be used or utilized to update a current AEC value of the second camera module.

In some examples, an icon for switching the zoom factor may be set on the photographing interface, and the user may click the icon to switch the zoom factor. For example, it is possible to set one icon for the zoom factor. Or, it is also possible to set two icons, one of the icons is configured to increase the zoom factor, and the other of the icons is configured to decrease the zoom factor. In this case, it is possible to switch the zoom factor by clicking one of the icons.

At block 103, the second camera module may be controlled or operated to start converging from the first AEC value in response to turning on the second camera module under the current scene, and a second AEC value of the second camera module in the automatic-exposure convergent state may be acquired. Likewise, the second AEC value may be acquired when the second camera module is in the automatic-exposure convergent state under the current scene, which means the second camera module has finished the AEC convergence.

After the first camera module is in the automatic-exposure convergent state, in case that the second camera module is turned on under the same scene with the first camera module, the second camera module may be controlled or operated to start converging from the first AEC value, and the second AEC value of the second camera module in the automatic-exposure convergent state may be acquired.

For example, the user may turn on the photographing device and aim at a distant building. At this time, the first camera module may be automatically exposed and further enter the automatic-exposure convergent state under the current scene. The first AEC value in the automatic-exposure convergent state may be 140. Under the current scene, the user may switch the zoom factor from 1 time to 2 times by utilizing the icon for switching the zoom factor. At this time, the second camera module may be turned on. After that, the second camera module may be controlled or operated to start converging from 140, and the second AEC value of the second camera module in the automatic-exposure convergent state may be acquired.

Figure 2:
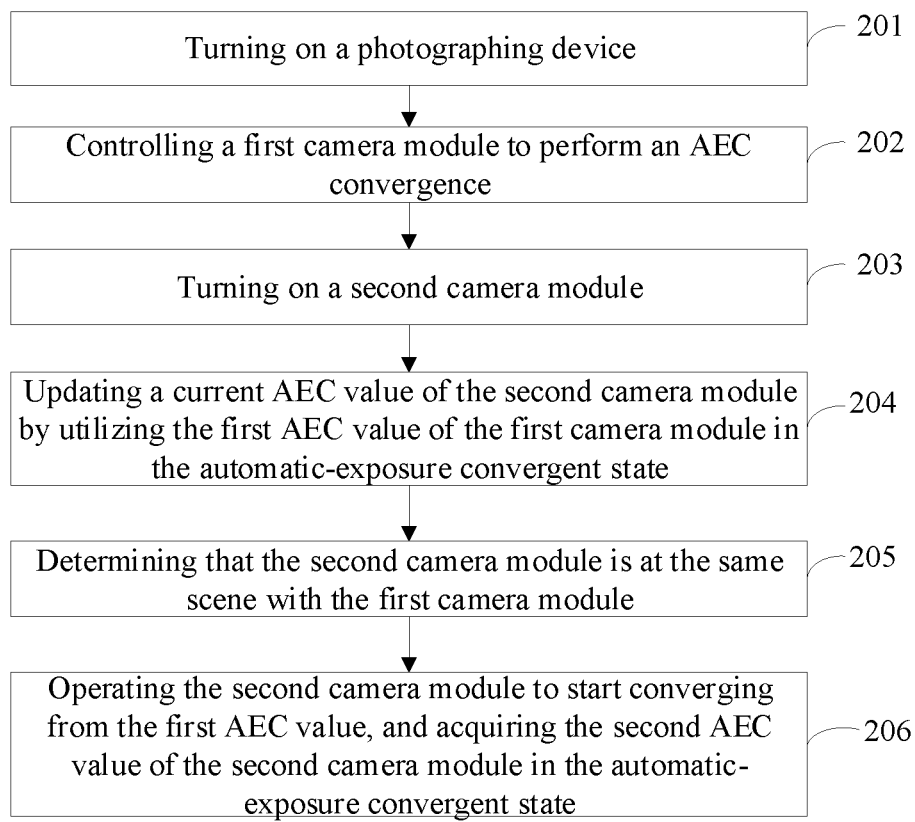
FIG. 2 is a flowchart of a method for accelerating AEC convergence according to some embodiments of the present disclosure.

After the second camera module is turned on, it is possible to determine whether the second camera module and the first camera module are under the same scene, such that the second camera module may be controlled or operated to start converging from the first AEC value of the first camera module under the same scene. The method for accelerating the AEC convergence according to some embodiments of the present disclosure may be described below by way of specific embodiments. FIG. 2 is a flowchart of a method for accelerating AEC convergence according to some embodiments of the present disclosure.

As shown in FIG. 2, the method for accelerating the AEC convergence may include operations executed by the following blocks.

At block 201, a photographing device may be turned on.

For example, the user may turn on the photographing device of a mobile phone to take a picture through the photographing device. In some embodiments, the turn-on instruction for turning on the photographing device may be monitored. In response to receiving the turn-on instruction by monitoring, the first camera module may be turned on by default.

At block 202, a first camera module may be controlled or operated to perform an AEC convergence.

After the first camera module is turned on, a third AEC value of the camera module that was in the photographing state (that is, in the active state) at the previous photographing process may be acquired from the buffer. After that, the first camera module may be controlled or operated to start converging from the third AEC value to acquire the first AEC value of the first camera module in the automatic-exposure convergent state.

At block 203, a second camera module may be turned on.

For example, the user may click on an icon for switching the zoom factor. At this time, a turn-on instruction for turning on the second camera module may be triggered. The second camera module may be turned on according to the turn-on instruction, in response to receiving the turn-on instruction by monitoring.

At block 204, a current AEC value of the second camera module may be updated by utilizing the first AEC value of the first camera module in the automatic-exposure convergent state.

In response to receiving the turn-on instruction for turning on the second camera module by monitoring, the first AEC value of the first camera module in the automatic-exposure convergent state may be shared with the second camera module, and the current AEC value of the second camera module may be updated by utilizing the first AEC value.

At block 205, whether the second camera module is at the same scene with the first camera module may be determined.

In order to increase the convergence speed of the second camera module, it may be firstly determined whether the second camera module is at the same scene with the first camera module, such that the second camera module may start converging from the first AEC of the first camera module in the automatic-exposure convergent state and under the same scene.

In some implementations, whether the first camera module is at the same scene with the second camera module may be determined by utilizing preview images of the first camera module and the second camera module. More specifically, a first preview image of the first camera module and a second preview image of the second camera module may be firstly acquired. In some embodiments, the first preview image may be a preview image of the first camera module which has been turned on, and the second preview image may be a preview image of the second camera module which has been turned on. After that, the second preview image of the second camera module and the first preview image of the first camera module may be analyzed. In response to the first view image being similar to the second preview image may be, it may be determined that the second camera module is at the same scene with the first camera module.

In some examples, objects included in the first preview image and the second preview image may be respectively identified. For example, a similarity between the objects included in the second preview image and the objects included in the first preview image may be acquired. In response to the similarity being greater than or equal to 80%, it may be determined that the second camera module is similar to the first camera module, thereby determining that the second camera module is at the same scene with the first camera module.

In some examples, whether the second preview image is similar to the first preview image may be determined by comparing colors of the second preview image and the first preview image. For example, in response to a color difference between the second preview image and the first preview image being less than a preset threshold, such as less than 10%, it may be determined that the second preview image is similar to the first preview image, thereby determining the second camera module is at the same scene with the first camera module.

In some implementations, in response to turning on the first camera module and the second camera module, a first turn-on time point of the first camera module and a second turn-on time point of the second camera module may be acquired and recorded. It may be determined that the second camera module is at the same scene with the first camera module in response to a time interval between the second turn-on time point and the first turn-on time point being within a preset time interval, such as 1 second.

For example, after the AEC convergence of the first camera module is completed and the image of the current scene is acquired, a turn-on instruction for turning on the second camera module may be triggered, and the second camera module may be turned on according to the turn-on instruction under the current scene. In response to the time interval between the second turn-on time and the first turn-on time being within a preset time interval, it may be determined that the second camera module is at the same scene with the first camera module.

At block 206, the second camera module may be controlled or operated to start converging from the first AEC value, and the second AEC value of the second camera module in the automatic-exposure convergent state may be acquired.

After determining that the second camera module is at the same scene with the first camera module, the second camera module may be controlled or operated to start converging from the first AEC value, and the second AEC value of the second camera module may be acquired when the second camera module is in the automatic-exposure convergent state. In other words, in case that the second camera module is turned on at the same scene with the first camera module, the second camera module may be controlled or operated to start converging from the first AEC value of the first camera module in the automatic-exposure convergent state.

In the method for accelerating the AEC convergence according to some embodiments of the present disclosure, the first AEC value of the first camera module in the automatic-exposure convergent state under the current scene may be acquired. The first AEC value under the current scene may be shared with the second camera module. The second camera module may be controlled or operated to start converging from the first AEC value in response to turning on the second camera module under the current scene, and the second AEC value of the second camera module in the automatic-exposure convergent state may be acquired. In some embodiments, the first AEC value of the first camera module acquired when the AEC of the first camera module is finished may be shared with the second camera module. In this way, the second camera module turned on under the same scene may start converging from the first AEC value, and the second AEC value of the second camera module in the automatic-exposure convergent state may be acquired. The first AEC value is the AEC value acquired after the first camera module has finished the AEC convergence, and thus the first AEC value is closer to an illumination condition of the photographing scene than the default AEC value of the second camera module. In this way, by utilizing the first AEC value as the initial AEC value of the second camera module such that the second camera module starts converging from the first AEC value, it is possible to achieve faster convergence, and the convergence in this case may take less time than the convergence starting from the default AEC value.

Figure 3:
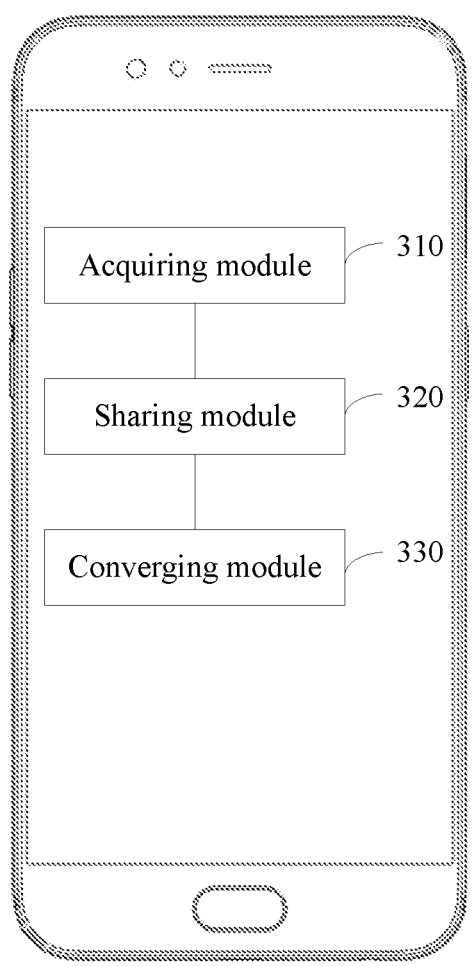
FIG. 3 is a structural block diagram of an apparatus for accelerating AEC convergence according to some embodiments of the present disclosure.

In some embodiments of the present disclosure, an apparatus for accelerating the AEC convergence may also be provided. FIG. 3 is a structural block diagram of an apparatus for accelerating AEC convergence according to some embodiments of the present disclosure.

As shown in FIG. 3, the apparatus for accelerating the AEC convergence may include an acquiring module 310, a sharing module 320, and a converging module 330.

The acquiring module 310 may be configured to acquire a first AEC value of a first camera module in an automatic-exposure convergent state under a current scene.

The sharing module 320 may be configured to share the first AEC value under the current scene with the second camera module.

The converging module 330 may be configured to control or operate the second camera module to start converging from the first AEC value in response to turning on the second camera module under the current scene, and acquire a second AEC value of the second camera module in the automatic-exposure convergent state.

Figure 4:
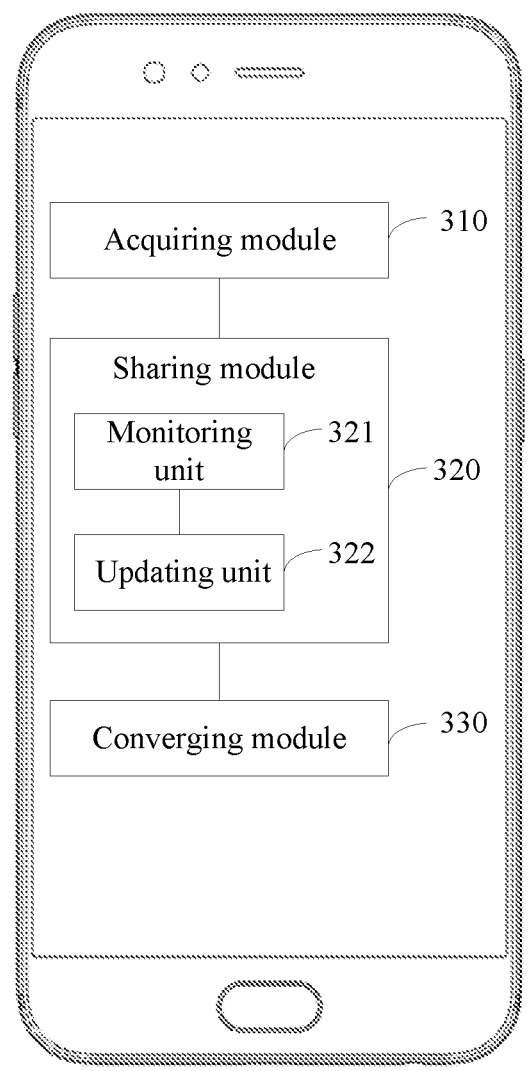
FIG. 4 is a structural block diagram of an apparatus for accelerating AEC convergence according to some embodiments of the present disclosure.

FIG. 4 is a structural block diagram of an apparatus for accelerating AEC convergence according to some embodiments of the present disclosure. In some implementations, as shown in FIG. 4, the sharing module 320 may include a monitoring unit 321 and an updating unit 322.

The monitoring unit 321 may be configured to monitor a turn-on instruction for turning on the second camera module.

The updating unit 322 may be configured to update a current AEC value of the second camera module by utilizing the first AEC value.

In some implementations, the turn-on instruction may be generated in response to a trigging operation for switching the zoom factor; and/or, the turn-on instruction may be generated in response to a state of the first camera module being in the automatic-exposure convergent state. That is to say, in some embodiments, the turn-on instruction may be generated in response to a trigging operation for switching the zoom factor, or the turn-on instruction may be generated in response to a state of the first camera module being in the automatic-exposure convergent state. In some embodiments, the turn-on instruction may be generated in response to a trigging operation for switching the zoom factor and in response to a state of the first camera module being in the automatic-exposure convergent state.

Figure 5:
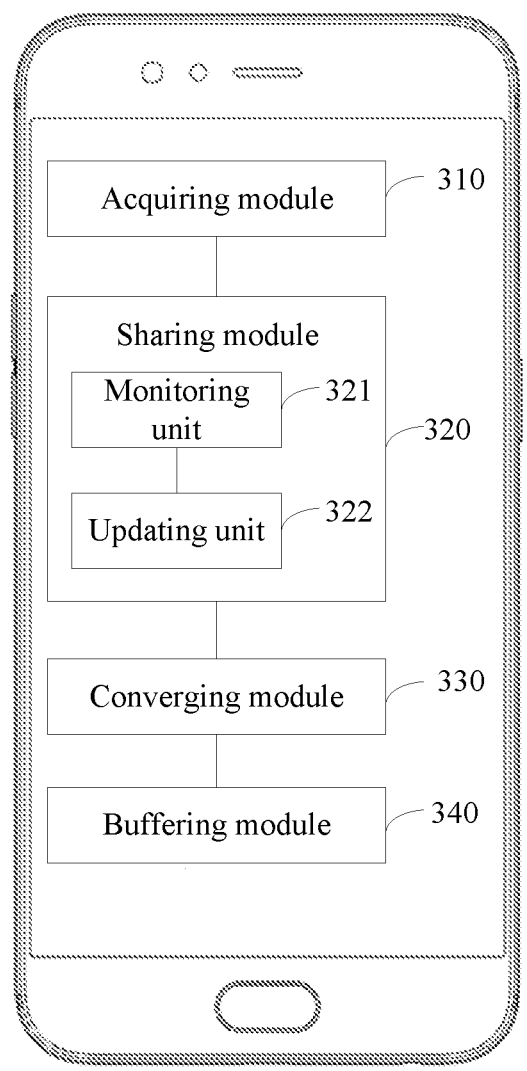
FIG. 5 is a structural block diagram of an apparatus for accelerating AEC convergence according to some embodiments of the present disclosure.

FIG. 5 is a structural block diagram of an apparatus for accelerating AEC convergence according to some embodiments of the present disclosure. In some implementations, as shown in FIG. 5, the apparatus may further include a buffering module 340.

In some embodiment, the buffering module 340 may be configured to monitor a turn-off instruction for turning off the photographing device. In some embodiments, the photographing device may include a first camera module and a second camera module.

The buffering module 340 may be further configured to record and store a third AEC value of the camera module in the photographing state (that is, in an active state) into a designated buffer, in response to receiving the turn-off instruction by monitoring. Herein, the designated buffer may be the buffering module stated above or another buffer configured to store data such as the third AEC value.

In some implementations, the buffering module 340 may be further configured to execute the following operations.

The third AEC value of the first camera module may be recorded and stored in the buffer, in response to the camera module in the active state being the first camera module.

Or, the third AEC value of the second camera module may be recorded and stored in the buffer, in response to the camera module in the active state being the second camera module.

Figure 6:
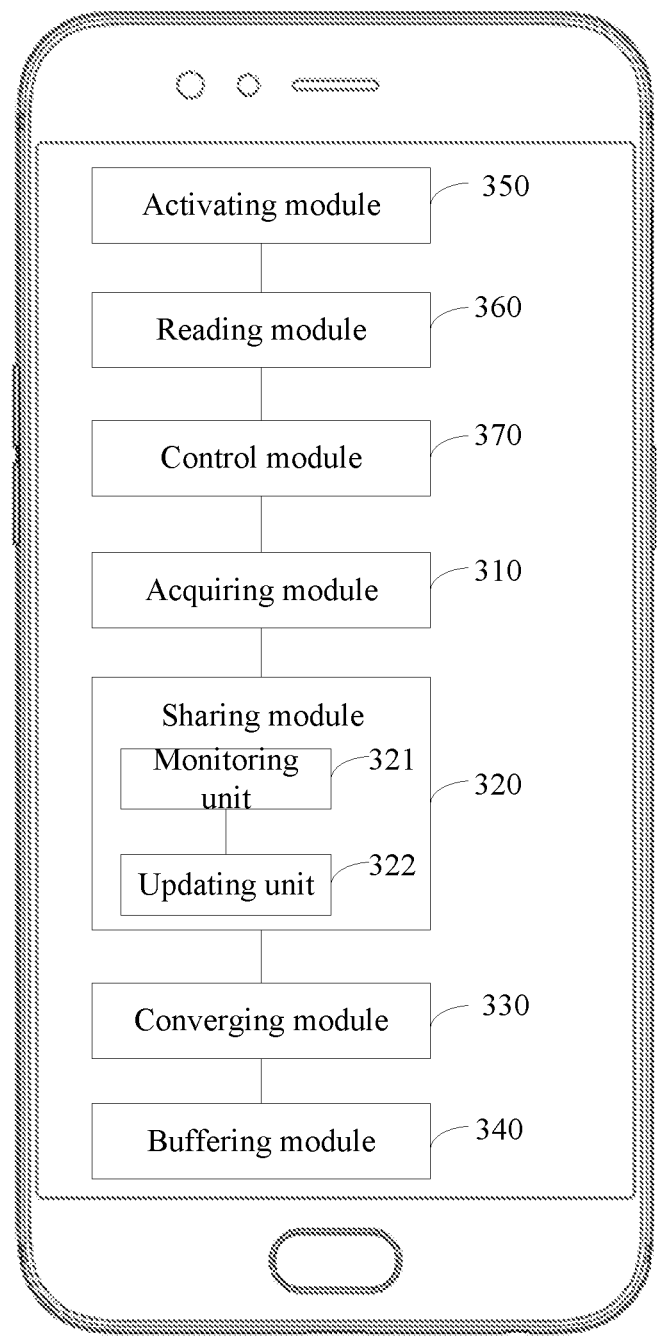
FIG. 6 is a structural block diagram of an apparatus for accelerating AEC convergence according to some embodiments of the present disclosure.

FIG. 6 is a structural block diagram of an apparatus for accelerating AEC convergence according to some embodiments of the present disclosure. In some implementations, as shown in FIG. 6, the apparatus further may include an activating module 350, a reading module 360, and a control module 370.

The activating module 350 may be configured to activate the first camera module before acquiring the first AEC value of the first camera module in the automatic-exposure convergent state under the current scene.

The reading module 360 may be configured to read the third AEC value from the buffer.

The control module 370 may be configured to control or operate the first camera module to start converging from the third AEC value.

In some implementations, the apparatus may further include an analysis module. The analysis module may be configured to analyze the second preview image of the second camera module and the first preview image of the first camera module.

The apparatus may further include a determining module. The determining module may be configured to determine that the second camera module is at the same scene with the first camera module in response to the first preview image being similar to the second preview image.

Furthermore, in some implementations, the analysis module may be further configured to execute the following operations.

Whether the first preview image is similar to the second preview image may be determined according to objects or colors included in the first preview image and the second preview image.

In some implementations, the acquiring module 310 may be further configured to acquire a first turn-on time point of the first camera module and a second turn-on time point of the second camera module.

The determining module may be further configured to determine that the second camera module is at the same scene with the first camera module in response to a time interval between the second turn-on time and the first turn-on time being within a preset time interval.

It should be noted that the foregoing description in the embodiments to the method for accelerating the AEC convergence may also be applicable to the apparatus for accelerating the AEC convergence in some embodiments. Thus, details may be not described herein again.

In the apparatus for accelerating the AEC convergence according to some embodiments of the present disclosure, the first AEC value of the first camera module in the automatic-exposure convergent state under the current scene may be acquired. The first AEC value under the current scene may be shared with the second camera module. The second camera module may be controlled or operated to start converging from the first AEC value in response to turning on the second camera module under the current scene, and the second AEC value of the second camera module in the automatic-exposure convergent state may be acquired. In some embodiments, the first AEC value of the first camera module acquired when the AEC of the first camera module is finished may be shared with the second camera module. In this way, the second camera module turned on under the same scene may start converging from the first AEC value, and the second AEC value of the second camera module in the automatic-exposure convergent state may be acquired. The first AEC value is the AEC value acquired after the first camera module has finished the AEC convergence, and thus the first AEC value is closer to an illumination condition of the photographing scene than the default AEC value of the second camera module. In this way, by utilizing the first AEC value as the initial AEC value of the second camera module and making the second camera module to start converging from the first AEC value, it is possible to achieve faster convergence, and the convergence in this case may take less time than the convergence starting from the default AEC value.

Figure 7:
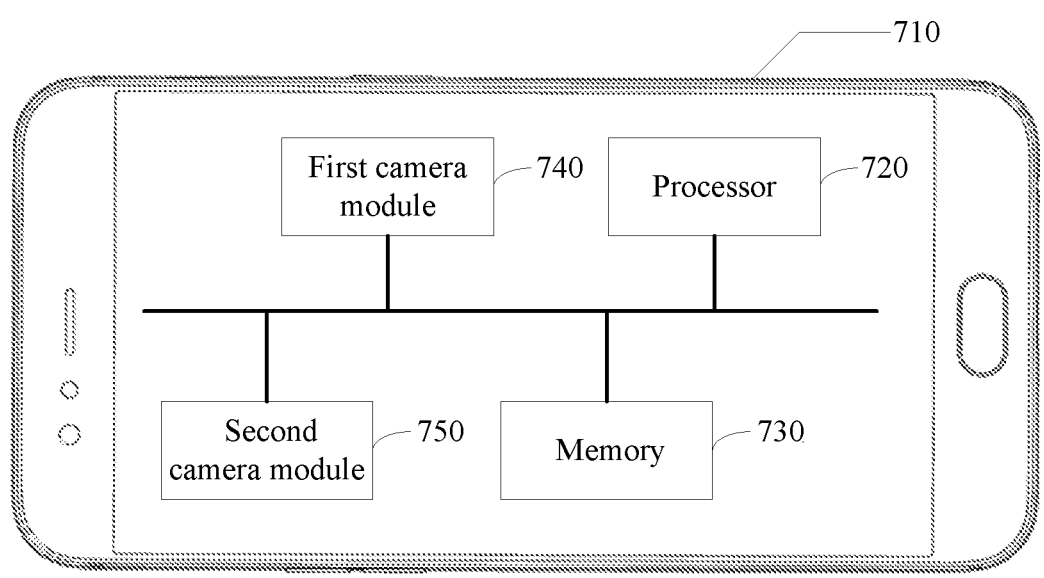
FIG. 7 is a structural block diagram of a terminal device according to some embodiments of the present disclosure.

In some embodiments of the present disclosure, a terminal device may be further provided. FIG. 7 is a structural block diagram of a terminal device according to some embodiments of the present disclosure. As shown in FIG. 7, the terminal device may include one or more of the following components comprising: a housing 710, a processor 720, a memory 730, a first camera module 740, and a second camera module 750. in some embodiments, the processor 720, the memory 730, the first camera module 740, and the second camera module 750 may be disposed in the housing 710.

The processor 720 may be configured to read an executable program code stored in the memory 730 and run a program corresponding to the executable program code, such that the processor 720 is caused to perform the aforementioned methods for accelerating the AEC convergence.

In some embodiments of the present disclosure, a non-transitory computer-readable storage medium may be provided. The non-transitory computer-readable storage medium may store a computer program. When the computer program is executed by the process, the method for accelerating the AEC convergence as described in the foregoing embodiments may be performed.

In addition, terms such as "first", "second", and the like, are used herein for purposes of description, and are not intended to indicate or imply relative importance or significance or to imply the number of indicated technical features. Thus, the feature defined with "first", "second", and the like may include one or more of such a feature. In the description of the present disclosure, it should be noted that, "a plurality of" means two or more, such as two, three, and the like, unless specified otherwise.

Any process or method description in the flowcharts or described in other means herein may be understood to represent a module, a segment or a portion of codes including one or more executable instructions for implementing the blocks of a custom logic function or process. Besides, the scope of the embodiments of the present disclosure may include additional implementations, in which the functions may not be performed in the shown or discussed order, and may be performed in a substantially simultaneous manner or in an opposite order, according to the functions involved. This will be understood by those skilled in the art of the present disclosure.

The logic and/or steps described in other manners herein or shown in the flow chart, for example, a particular order list of executable instructions for realizing the logical function, may be specifically achieved in any computer-readable medium to be used by an instruction execution system, a device or an equipment (such as a system based on computers, a system including processors or other systems capable of acquiring an instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium may include but be not limited to: an electronic connection (an electronic device) with one or more wires, a portable computer enclosure (a magnetic device), a random-access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), and the like.

Those skilled in the related art should be noted that all or part of actions in the above-described embodiments can be implemented by a program instructing related hardware. The program may be stored in a computer-readable medium. The program may be executed to perform at least one of the actions in the method embodiments.

Furthermore, each of functional units may be integrated in one processing unit or be a separate physical unit. For example, two or more units are integrated in a single unit. The integrated units may be implemented in a form of hardware or software functional module. In one embodiment, when the integrated units are implemented in the form of a software functional module which is sold or used as an independent product, the integrated units may be stored in a computer-readable storage medium.

The computer-readable storage medium may be a read-only memory, a magnetic disk or optical disk. Although the embodiments of the present disclosure are shown and described in the above, however, it should be understood that, the foregoing embodiments of the present disclosure are illustrative rather than limiting of the present disclosure. Those skilled in the art may make various modifications, changes, equivalent replacements, and transformations within the scope of the present disclosure.

What is claimed is:

1. A method for accelerating AEC (Automatic Exposure Control) convergence, comprising:
    acquiring a first AEC value of a first camera module in an automatic-exposure convergent state under a current scene;
    sharing the first AEC value under the current scene with a second camera module;
    operating the second camera module to start converging from the first AEC value in response to turning on the second camera module under the current scene, and acquiring a second AEC value of the second camera module in the automatic-exposure convergent state; and
    determining whether the second camera module is at a same scene with the first camera module, comprising at least one of:
        determining that the second camera module is at the same scene with the first camera module in response to a first preview image of the first camera module being similar to a second preview image of the second camera module; or
        determining that the second camera module is at the same scene with the first camera module in response to a time interval between a first turn-on time point of the first camera module and a second turn-on time point of the second camera module being within a preset time interval.

2. The method according to claim 1, wherein the sharing the first AEC value under the current scene with the second camera module, comprises:
    monitoring a turn-on instruction for turning on the second camera module; and
    updating a current AEC value of the second camera module by utilizing the first AEC value.

3. The method according to claim 2, wherein
    the turn-on instruction is generated in response to at least one selected from a group consisting of:
    a triggering operation for switching a zoom factor; and
    a state of the first camera module being in the automatic-exposure convergent state.

4. The method according to claim 1, further comprising:
    monitoring one of the first camera module or the second camera module in an active state; and
    recording and storing a third AEC value of the monitored camera module in the active state into a designated buffer, in response to receiving a turn-off instruction for turning off the monitored camera module in the active state by monitoring, comprising:
        recording the third AEC value of the first camera module and storing the third AEC value into the buffer in response to the monitored camera module in the active state being the first camera module; or
        recording the third AEC value of the second camera module and storing the third AEC value into the buffer in response to the monitored camera module in the active state being the second camera module.

5. The method according to claim 4, further comprising:
    before acquiring the first AEC value of the first camera module in the automatic-exposure convergent state under the current scene:
    activating the first camera module;
    reading the third AEC value from the buffer; and
    operating the first camera module to start converging from the third AEC value.

6. The method according to claim 4, wherein the turn-off instruction is generated in response to at least one selected from a group consisting of:
    switching from a photographing interface to another interface; and
    clicking a return button on the photographing interface.

7. The method according to claim 1, wherein determining that the second camera module is at a same scene with the first camera module in response to a first preview image of the first camera module being similar to a second preview image of the second camera module comprises:
    determining whether the first preview image is similar to the second preview image according to objects or colors comprised in the first preview image and the second preview image.

8. The method according to claim 7, wherein the determining whether the first preview image is similar to the second preview image according to the objects or colors comprised in the first preview image and the second preview image, comprises:
    acquiring a similarity between the first preview image and the second preview image, and determining that the first preview image is similar to the second preview image in response to the similarity being greater than or equal to a first threshold; or
    acquiring a color difference between the first preview image and the second preview image, and determining that the first preview image is similar to the second preview image in response to the color difference being less than a second threshold.

9. A terminal device, comprising: a housing, a processor, a memory, a first camera module, and a second camera module; the processor, the memory, the first camera module, and the second camera module being disposed in the housing;
    the memory being configured to store an executable program code, and the processor being configured to read and execute the executable program code to perform a method for accelerating AEC convergence; the method comprising:
        acquiring a first AEC value of the first camera module in an automatic-exposure convergent state under a current scene;
        sharing the first AEC value under the current scene with the second camera module;
        operating the second camera module to start converging from the first AEC value in response to turning on the second camera module under the current scene, and acquiring a second AEC value of the second camera module in the automatic-exposure convergent state; and
        determining whether the second camera module is at a same scene with the first camera module, comprising at least one of:
            determining that the second camera module is at the same scene with the first camera module in response to a first preview image of the first camera module being similar to a second preview image of the second camera module; or determining that the second camera module is at the same scene with the first camera module in response to a time interval between a first turn-on time point of the first camera module and a second turn-on time point of the second camera module being within a preset time interval.

10. The terminal device according to claim 9, wherein the sharing the first AEC value under the current scene with a second camera module, comprises:
monitoring a turn-on instruction for turning on the second camera module; and
updating a current AEC value of the second camera module by utilizing the first AEC value.

11. The terminal device according to claim 9, further comprising:
monitoring one of the first camera module or the second camera module in an active state; and
recording and storing a third AEC value of the monitored camera module in the active state, into a designated buffer, in response to receiving a turn-off instruction for turning off the monitored camera module in the active state by monitoring, comprising:
recording the third AEC value of the first camera module and storing the third AEC value into the buffer in response to the monitored camera module in the active state being the first camera module; or
recording the third AEC value of the second camera module and storing the third AEC value into the buffer in response to the monitored camera module in the active state being the second camera module.

12. The terminal device according to claim 11, wherein the method further comprises:
before acquiring a first AEC value of a first camera module in an automatic-exposure convergent state under a current scene:
activating the first camera module;
reading the third AEC value from the buffer; and
operating the first camera module to start converging from the third AEC value.

13. A non-transitory computer-readable storage medium storing a computer program which, when executed by a processor, causes the processor to perform a method for accelerating AEC convergence, and the method comprises:
acquiring a first AEC value of a first camera module in an automatic-exposure convergent state under a current scene;
sharing the first AEC value under the current scene with a second camera module;
operating the second camera module to start converging from the first AEC value in response to turning on the second camera module under the current scene, and
acquiring a second AEC value of the second camera module in the automatic-exposure convergent state; and
determining whether the second camera module is at a same scene with the first camera module, comprising at least one of:
determining that the second camera module is at the same scene with the first camera module in response to a first preview image of the first camera module being similar to a second preview image of the second camera module; or
determining that the second camera module is at the same scene with the first camera module in response to a time interval between a first turn-on time point of the first camera module and a second turn-on time point of the second camera module being within a preset time interval.

14. The non-transitory computer-readable storage medium according to claim 13, wherein the sharing the first AEC value under the current scene with the second camera module, comprises:
monitoring a turn-on instruction for turning on the second camera module; and
updating a current AEC value of the second camera module by utilizing the first AEC value.

15. The non-transitory computer-readable storage medium according to claim 13, further comprising:
monitoring one of the first camera module or the second camera module in an active state;
recording a third AEC value of the first camera module and storing the third AEC value into a buffer in response to the monitored camera module in the active state being the first camera module and a turn-off instruction for turning off the first camera module being received by monitoring; or recording a third AEC value of the second camera module and storing the third AEC value into the buffer in response to the monitored camera module in the active state being the second camera module and a turn-off instruction for turning off the second camera module being received by monitoring.

16. The non-transitory computer-readable storage medium according to claim 15, wherein before acquiring a first AEC value of a first camera module in an automatic-exposure convergent state under a current scene, the method further comprises:
activating the first camera module;
reading the third AEC value from the buffer; and
operating the first camera module to start converging from the third AEC value.

* * * * *